UNITED STATES PATENT OFFICE.

WILLIAM N. BLAKEMAN, JR., OF MOUNT VERNON, NEW YORK.

PAINT COMPOSITION.

1,385,034.     Specification of Letters Patent.     Patented July 19, 1921.

No Drawing.     Application filed June 12, 1917. Serial No. 174,256.

*To all whom it may concern:*

Be it known that I, WILLIAM N. BLAKEMAN, Jr., a citizen of the United States, and resident of the city of Mount Vernon, in the county of Westchester and State of New York, have invented a new and useful Paint Composition, which invention is fully set forth in the following specification.

The object of this invention is to utilize as pigments, in the art of painting, in an economical and satisfactory manner all matter that is stable in character and can be reduced to an amorphous and impalpable condition.

The behavior of pigments toward oil-vehicles, when ground therein, is by no means uniform, very many of the combinations thus made, especially those with anhydrous pigments, showing an utter lack of spreading power and diffusive opacity; and this marked deficiency greatly detracts from their usefulness.

I have discovered that all pigments may be ground with an agent which will harmonize and combine with them, and that the magma so formed, will also be congruent to and combine with all oil vehicles, and possess, when ground therein, great spreading power, accelerated drying power and diffusion of opacity. The agent which I use to produce these effects is a hydrocarbon or mineral oil of the class obtained chiefly from the Texas, Gulf, and California oil fields. The oils in this class, or group, of which the "Texas Oils" are regarded as the type, are known commercially as "asphaltic base oils" and are regarded chemically as being largely composed of unsaturated hydrocarbons; and either the crude oil, or any of its fractions, distillates, or residuals, may be used in carrying out my invention. The specific oil which I have employed is that from the Sour Lake district, Texas, preferably the available distillates now on the market, varying from .92 to .94 sp. gr. The specific gravity of the crude oil varies from .90 to .92 and that of the residuals from .990 to 1.000.

In carrying out my invention, I take the pigment desired for use, and grind it to paste form in one of the asphaltic-base hydrocarbons. This composition, or magma, can be placed upon the market, like the present form of pigment ground in oil (which is a mere matter of economical transportation) and, when desired for use as a paint, may be extended in any suitable oil-vehicle.

Instead, however, of thus grinding the pigment in the asphaltic-base hydrocarbon and then adding the vehicle, the asphaltic-base hydrocarbon may be incorporated in the selected vehicle, and the pigment then ground in this mixture; the ultimate result being the same in either case.

The proportion of pigment used will depend upon its nature and may range, for example, from two hundred per cent. (200%) for chalk to three hundred per cent. (300%) for barytes, and to upward of six hundred per cent. (600%) of sublimed compounds of zinc and lead. The precentage of asphaltic-base hydrocarbon to be incorporated in the vehicle will also vary with the nature of the pigment and the vehicle, from eight (8) to twelve (12) per cent., or an average of ten per cent. (10%), giving good results in general.

Any fatty oil, such as linseed oil, may be employed as a vehicle, but very satisfactory and economical compositions can be formed with the non-drying and semi-drying fatty oils, as in examples 4, 5, 6, 8 and 9 below given. The compositions, while possessing great spreading power and opacity, may be slow in drying, and I prefer, in all cases, to accelerate the drying action by incorporating another drying oil, preferably tung oil, or a mixture of tung oil and marine animal oil, the result being a very decided reduction in the time required for drying. The use of tung oil in conjunction with the Texas oil is specifically claimed in application No. 443671, filed February 9, 1921.

As the asphaltic base hydrocarbons will act as solvents for many of the animal, vegetable and mineral residuals, waxes, resins, stearins and the like, it may be found advantageous, in some cases, to incorporate a small proportion of one or more of these substances in the composition, as they will render the ultimate paint film much more resistant to atmospheric and abrasive influences. Thus, naphthalene ($C_{10}H_8$) a derivative of the coal-tar hydrocarbons by reason of its great abundance, would be a most economical agent to use, from three (3) to five per cent. (5%) added to the oil-vehicle, or to the asphaltic-base hydrocarbon, greatly increasing the permanency of the paint-film.

The asphaltic-base hydrocarbon may, if desired, be oxidized or hydrogenated, or both; and although the initial reaction in each case is feeble, yet sufficient molecular change is effected to increase its reaction when brought into contact with anhydrous pigments and oil-vehicles or oxidizable matter. A run of two or three hours on oxidizers, at a temperature of two hundred and fifty degrees (250°) Fahr., and a run of half or three quarters of an hour, with hydrogen, in the presence of catalysts, will be sufficient. The term zinc-lead, as used herein, is intended to designate a class of pigments which have been on the market for many years and are now well-known in the trade by that name. They are all composed of zinc oxid and lead sulfate in varying proportions, the one which I prefer consisting, approximately, of 60 per cent. zinc oxid and 40 per cent. lead sulfate.

The oxidation and hydrogenation of the hydrocarbons, are claimed in applications Nos. 443672 and 443673, filed February 9, 1921.

The following are examples of compositions which will produce satisfactory results:

(1) Eighty (80) parts linseed oil; ten per cent. (10%) asphaltic-base hydrocarbon of .9302 sp. gr.; fifteen per cent. (15%) tung oil; one hundred and fifty (150) parts barytes (natural); and thirty (30) parts zinc-lead (sixty per cent. (60%) zinc oxid and forty per cent. (40%) lead sulfate).

(2) Eighty (80) parts linseed oil; fifteen per cent. (15%) asphaltic-base hydrocarbon of .9302 sp. gr.; fifteen per cent. (15%) tung oil; and one hundred and fifty (150) parts barytes (natural); and thirty (30) parts zinc-lead.

(3) Eighty (80) parts linseed oil; fifteen per cent. (15%) asphaltic-base hydrocarbon, oxidized and hydrogenated, of .9370 sp. gr.; fifteen per cent. (15%) tung oil; and one hundred (100) parts zinc-lead.

(4) Eighty (80) parts soja bean oil; ten per cent. (10%) asphaltic-base hydrocarbon, hydrogenated, of .9302 sp. gr.; fifteen per cent. (15%) tung oil; one hundred and fifty (150) parts barytes; and thirty (30) parts zinc-lead.

(5) Eighty (80) parts cotton-seed oil; ten per cent. (10%) asphaltic-base hydrocarbon, hydrogenated, of .9302 sp. gr.; fifteen per cent. (15%) tung oil; fifteen per cent. (15%) menhaden oil; thirty (30) parts chalk; and thirty (30) parts zinc-lead.

(6) Eighty (80) parts cotton-seed oil; ten per cent. (10%) asphaltic-base hydrocarbon, hydrogenated, of .9302 sp. gr.; fifteen per cent. (15%) tung oil; one hundred and fifty (150) parts barytes; and thirty (30) parts zinc-lead.

(7) Eighty (80) parts linseed oil; fifteen per cent. (15%) asphaltic-base hydrocarbon, of .9302 sp. gr.; fifteen per cent. (15%) tung oil; fifteen per cent. (15%) menhaden oil; three per cent. (3%) naphthalene; one hundred and fifty (150) parts barytes (natural); and thirty (30) parts zinc-lead.

(8) Eighty (80) parts soy bean oil; ten per cent. (10%) asphaltic-base hydrocarbon, hydrogenated, of .9302 sp. gr.; fifteen per cent. (15%) tung oil; five per cent. (5%) naphthalene; one hundred and fifty (150) parts barytes (natural); and thirty (30) parts zinc-lead.

(9) Eighty (80) parts soy bean oil; fifteen per cent. (15%) tung oil; fifteen per cent. (15%) menhaden oil; ten per cent. (10%) asphaltic-base hydrocarbon, hydrogenated, showing .9302 sp. gr.; three per cent. (3%) naphthalene; thirty (30) parts powdered serpentine (as talc or asbestos); thirty (30) parts calcium silicate; and thirty (30) parts zinc-lead.

The above mixtures, with the usual quantity of commercial liquid drier added, when spread as a paint, will firm or dry in from two and one-half (2½) to five (5) hours, and subsequently indurate satisfactorily.

By means of my invention, all the so-called inert or inactive substances which, heretofore, have been used in the painter's art as mere adulterants, may be employed as a basis for paint, as the magma formed by grinding such substances in the asphaltic-base hydrocarbon, not only immediately becomes congruent to all oil-vehicles, but also assists, with its diffusive opacity, in increasing the index of refraction. Opacity is one of the most expensive attributes of the present system of painting as based on the use of Dutch white lead, because so much more pigment is used than is necessary that the result is a decided economic loss. When, however, all inert or inactive matter is brought into active participation in diffusive opacity, as is done by my invention, and a paint produced which will not deteriorate, the result is a decided economic gain. The result obtained is very marked with barium sulfate, natural; the lead salts, such as the sulfate and carbonate, even in a minute crystalline condition; silica and the silicious minerals in general, such as calcium and magnesium; and the serpentines, such as talc, asbestos and the like.

Any suitable commercial liquid drier may be used. All the oil factors in the oil-vehicle must, for the best effects, be water free.

The vehicle herein described is claimed in another application filed herewith and bearing the Serial Number 174,255.

I am aware that it has been proposed, heretofore, to use crude hydrocarbons, as well as the residuals of distillation, in admixture with a variety of other ingredients, for water-proofing and cement purposes, but such compositions I expressly disclaim, as they did not have for their object the formation of an anhydrous system of painting and could not be used for my purpose. I believe myself to be the first to employ the unsaturated hydrocarbons known commercially as asphaltic base hydrocarbons, for the purpose of adapting the anhydrous pigments for successful use.

Having thus freely described my invention, I claim:

1. A paint-composition comprising a mineral oil of the Texas oil type, and an anhydrous pigment.

2. A paint-composition comprising a fatty oil; a mineral oil of the Texas oil type; and an anhydrous pigment.

3. A paint-composition comprising a fatty oil; a mineral oil of the Texas oil type; tung oil; and an anhydrous pigment.

4. A paint-composition comprising a non-drying fatty oil; a mineral oil of the Texas oil type; and an anhydrous pigment.

5. A paint-composition comprising a non-drying fatty oil; a mineral oil of the Texas oil type; tung oil; and an anhydrous pigment.

6. A paint-composition comprising a mineral oil of the Texas oil type; an agent resistant to atmospheric and abrasive influences; and an anhydrous pigment.

7. A paint-composition comprising a mineral oil of the Texas oil type, oxidized; and an anhydrous pigment.

8. A paint-composition comprising a mineral oil of the Texas oil type, oxidized; tung oil; and an anhydrous pigment.

9. A paint-composition comprising a mineral oil of the Texas oil type, oxidized and hydrogenated; and an anhydrous pigment.

10. A paint-composition comprising a mineral oil of the Texas oil type, oxidized and hydrogenated; tung oil; and an anhydrous pigment.

WM. N. BLAKEMAN, Jr.